United States Patent
Harb (10) Patent No.: US 12,413,323 B1
(45) Date of Patent: *Sep. 9, 2025

(54) AUGMENTING CONTENT FOR OVER-THE-AIR BROADCAST RADIO (AM OR FM) IN CONNECTED RADIO AND/OR ON MOBILE APPLICATIONS SYNCHRONIZED WITH OVER-THE-AIR BROADCAST RADIO

(71) Applicant: Joseph Harb, Woodinville, WA (US)

(72) Inventor: Joseph Harb, Woodinville, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/352,226

(22) Filed: Jul. 13, 2023

Related U.S. Application Data (63) Continuation of application No. 16/739,491, filed on Jan. 10, 2020, now Pat. No. 11,736,215.

(60) Provisional application No. 62/790,729, filed on Jan. 10, 2019.

(51) Int. Cl.
| | |
|---|---|
| *H04H 20/91* | (2008.01) |
| *G06Q 30/0251* | (2023.01) |
| *H04H 60/74* | (2008.01) |
| *H04N 21/43* | (2011.01) |

(52) U.S. Cl.
CPC ......... *H04H 20/91* (2013.01); *G06Q 30/0269* (2013.01); *H04H 60/74* (2013.01); *H04N 21/43074* (2020.08); *H04H 2201/13* (2013.01)

(58) Field of Classification Search
CPC . H04N 21/235; H04N 21/242; H04N 21/4307
USPC ............................................ 725/132
See application file for complete search history.

(56) References Cited

U.S. PATENT DOCUMENTS

| | | | | |
|---|---|---|---|---|
| 5,197,084 A * | 3/1993 | Fuhrman | ........... | H04L 27/14 375/334 |
| 7,333,864 B1 * | 2/2008 | Herley | ........... | G06F 16/683 381/58 |
| 2004/0027271 A1* | 2/2004 | Schuster | ........... | H04N 21/42684 342/51 |
| 2007/0196802 A1* | 8/2007 | Beletski | ........... | G09B 7/00 434/323 |
| 2010/0254337 A1* | 10/2010 | Lin | ........... | H04W 28/06 370/328 |
| 2013/0198792 A1* | 8/2013 | Wright | ........... | H04N 21/84 725/116 |
| 2015/0193516 A1* | 7/2015 | Harb | ........... | G06Q 30/02 707/625 |

(Continued)

*Primary Examiner* — Jason Salce
(74) *Attorney, Agent, or Firm* — FisherBroyles, LLP; Jeremy P Sanders; Glen L Nuttall (57) ABSTRACT

A synchronization server creates an augmented radio listener experience by providing additional information, especially visual information, over a concurrent, parallel data connection to a user device during the radio broadcast. The additional information is synchronized to the radio broadcast item then playing, based on an event message received by the synchronization server from the radio station equipment. The synchronization server can implement real-time interactions between connected radio listeners and a disk jockey dashboard of the radio station. The synchronization server optionally can personalize advertisement content for transmission to user devices based on user profile information and audience criteria provided by the advertiser.

8 Claims, 6 Drawing Sheets

(56) References Cited

U.S. PATENT DOCUMENTS

| | | | |
|---|---|---|---|
| 2016/0092939 A1* | 3/2016 | Beattie, Jr. | H04N 21/4788 |
| | | | 705/14.66 |
| 2016/0189249 A1* | 6/2016 | Meyer | H04L 67/53 |
| | | | 705/14.66 |
| 2017/0070789 A1* | 3/2017 | Liassides | H04N 21/262 |
| 2017/0262894 A1* | 9/2017 | Kirti | G06F 16/285 |

* cited by examiner

FIG. 1

SYNC SERVER

FIG. 2

Advertiser Name

FIG. 3A

Advertiser Message

FIG. 3B

Radio Billboard

FIG. 3C

Artist Message

FIG. 3D

Artist Experience

AUGMENTING CONTENT FOR OVER-THE-AIR BROADCAST RADIO (AM OR FM) IN CONNECTED RADIO AND/OR ON MOBILE APPLICATIONS SYNCHRONIZED WITH OVER-THE-AIR BROADCAST RADIO

RELATED APPLICATION

This application is a continuation of U.S. patent application Ser. No. 16/739,491 filed Jan. 10, 2020, which claims priority to U.S. Provisional Application No. 62/790,729 filed Jan. 10, 2019, both of which are incorporated herein by this reference.

COPYRIGHT NOTICE

©2019-2020 QUU Inc. A portion of the disclosure of this patent document contains material which is subject to copyright protection. The copyright owner has no objection to the facsimile reproduction by anyone of the patent document or the patent disclosure, if and when it appears in the Patent and Trademark Office public records, but otherwise reserves all copyright rights whatsoever. 37 CFR § 1.71 (d).

TECHNICAL FIELD

This application pertains to over-the-air radio broadcasting and, more specifically, to circuits and software methods for creating a synchronized data connection operating in parallel with an over-the-air radio broadcast to provide augmented and optionally personalized content to connected radio devices and synchronized mobile applications.

BACKGROUND

Connected Radios are radio receivers in vehicles or other that have a data connection to internet via wi-fi or a mobile wireless data connection such as 3G, 4G or 5G. As a result, stereos in cars or elsewhere are becoming "connected" enabling hybrid stereos, where the audio is still broadcast via FM or AM or satellite radio, but where the radio display information is provided via the data connection for a richer experience. We described such systems in our U.S. Pat. No. 9,940,632 dated Apr. 10, 2018 entitled REAL-TIME BROADCAST CONTENT SYNCHRONIZATION DATABASE SYSTEM. That patent enables providing advertisement metadata via an over-the-air connection or to connected devices such as connected stereo or a mobile device or a computer. In the connected car and through hybrid stereos, such systems can provide advertisement or any other metadata synchronized with the audio content when an ad or other content plays over the air or when it simply is a displayed ad or other content that is not synchronized with any specific audio. This application does not claim synchronizing the Artist and Title and Album Art of a broadcasted music as this is common practice.

The need remains to augment this information with additional content related to the song or the artist such as a concert date or the name of the artist's sponsor or other details that may be relevant to that artist or song.

The need remains for providing rich visual content such as pictures that are synchronized to the audio content now playing over a broadcast radio station.

A need further remains for augmented content that is personalized to the radio listener or television viewer based on their individual preferences, interests, and other personal profile factors.

Further, the need remains to make mobile radio listening truly interactive, well beyond the user manually placing a telephone call to the station or simply clicking on a link.

SUMMARY OF THE DISCLOSURE

The following is a summary of the present disclosure in order to provide a basic understanding of some features and context. This summary is not intended to identify key/critical elements of the present disclosure or to delineate the scope of the disclosure. Its sole purpose is to present some concepts of the present disclosure in a simplified form as a prelude to the more detailed description that is presented later.

Synchronized Mobile Application is an application that runs on mobile devices that auto-synchronizes with regular over-the-air broadcast radio (AM/FM) or TV by listening to an inaudible signature combined with the broadcasted audio, determining which station the regular stereo is tuned to, therefore enabling the display of synchronized or pertinent Augmented Interactive Content. To this effect the Synchronized Mobile Application acts as the interactive screen to any stereo.

The augmented metadata can be displayed on the radio or on the Synchronized Mobile Application. The augmented metadata may be customized based on broadcast station location, time of day, and other factors.

In one example, a system according to this disclosure may comprise:
- a middleware component coupled to a broadcast radio station automation server, the middleware component arranged to receive an event message from the station automation system that identifies an audio item now playing;
- a datastore to store augmented content data associated with items that may be played on the radio station;
- a synchronization server including a processor and a memory, the memory storing software code executable on the processor;
- the synchronization server having a first interface arranged for communication with the middleware component;
- the synchronization server having a second interface arranged for communication with the datastore;
- the synchronization server having a third interface arranged for communication over a data connection with a user device;
- wherein the software code is configured to cause the processor to, in near real time:
- using the first interface, receive the event message from the middleware component;
- identify from the event message an item now playing on the broadcast station;
- using the second interface, query the datastore based on the identified item now playing to acquire augmented content data associated with the identified item now playing; and
- using the third interface, transmit the augmented content data over the data connection to a user device for display on a user interface of the user device so that the augmented content is synchronized to the audio item now playing.

In one aspect, the methods and systems of this disclosure enable, over the data connection, for different visual content to be sent to different listeners depending on the advertiser criteria and or user criteria. For example, if a dealership that sells two different brands of cars ad plays over the radio, one user may see information about car 1 and driver 2 may see information about car 2 depending on their preferences or profile. The audio portion playing over the broadcast channel is the same for both.

In another aspect of this disclosure, in the Connected Radio, different audio content may be sent to each different user during the ad play time. That is, when the ad plays, the over-the-air audio content is replaced by a streaming audio via the data connection to play and display different ads or content to different listeners to the same radio frequency. For example, if two drivers are listening to the same station and a radio ad airs, listener 1 may hear an ad about food while listener 2 hears an ad about cars, depending on the listener profile or interests and other factors. Similarly, in television applications, different audio and video content can be streamed to the viewer, wherein the content is selected by the viewer's profile or preferences.

In another aspect, in a case where the listener profile does not fit the criteria of the aired ad (provided by the advertiser), the synchronization server may attach a different ad, replacing both the audio and the visuals of that ad. The listener to regular over-the-air radio broadcast will hear and see a completely different ad than other listeners that are listening to the same broadcast station. Thus, the broadcast radio content effectively is personalized.

In a fourth aspect, the listener may be listening to over-the-air radio and has the Synchronized Mobile Application running. In this case, the synchronized mobile device becomes effectively the interactive screen of the listened to device, where interactive and possibly personalized content is displayed in sync with the broadcasted content.

BRIEF DESCRIPTION OF THE DRAWINGS

In order to describe the manner in which the above recited and other advantages and features of the disclosure can be obtained, a more particular description follows by reference to the specific embodiments thereof which are illustrated in the appended drawings. Understanding that these drawings depict only typical embodiments of the present disclosure and are not therefore to be considered to be limiting of its scope, the present disclosure will be described and explained with additional specificity and detail through the use of the accompanying drawings in which.

DETAILED DESCRIPTION OF PREFERRED EMBODIMENTS

Glossary

Radio Display System (RDS) is a communications protocol standard for embedding small amounts of digital information in conventional FM radio broadcasts. RDS standardizes several types of information transmitted, including time, station identification and program information. In a simple example, the embedded text my include a song title and artist, or a short advertising message ("Stop a McDonalds for a healthy fast breakfast today"). For example, an advertisement may replace the song title and artist after 60 seconds.

Digital Audio Broadcasting (DAB) is a digital radio standard for broadcasting digital audio radio services, used in many countries around the world, though not North America where HD Radio is used instead. Some countries have implemented Eureka-147 digital audio broadcasting (DAB). DAB broadcasts a single multiplex that is approximately 1,500 kilohertz wide (~1,000 kilobits per second). That multiplex is then subdivided into multiple digital streams of between 9 and 12 programs. HD Radio is a proprietary system from the company IBiquity. DAB is an open standard deposited at ETSI.

Connected Radio means a broadcast radio receiver that also implements or can be coupled to a wireless data connection for bi-directional data communications. Typically, the radio receiver and the data connection are distinct and can be operated independently of each other.

Connected Car refers to a vehicle with an on-board Connected Radio.

Example System

Figure 1:
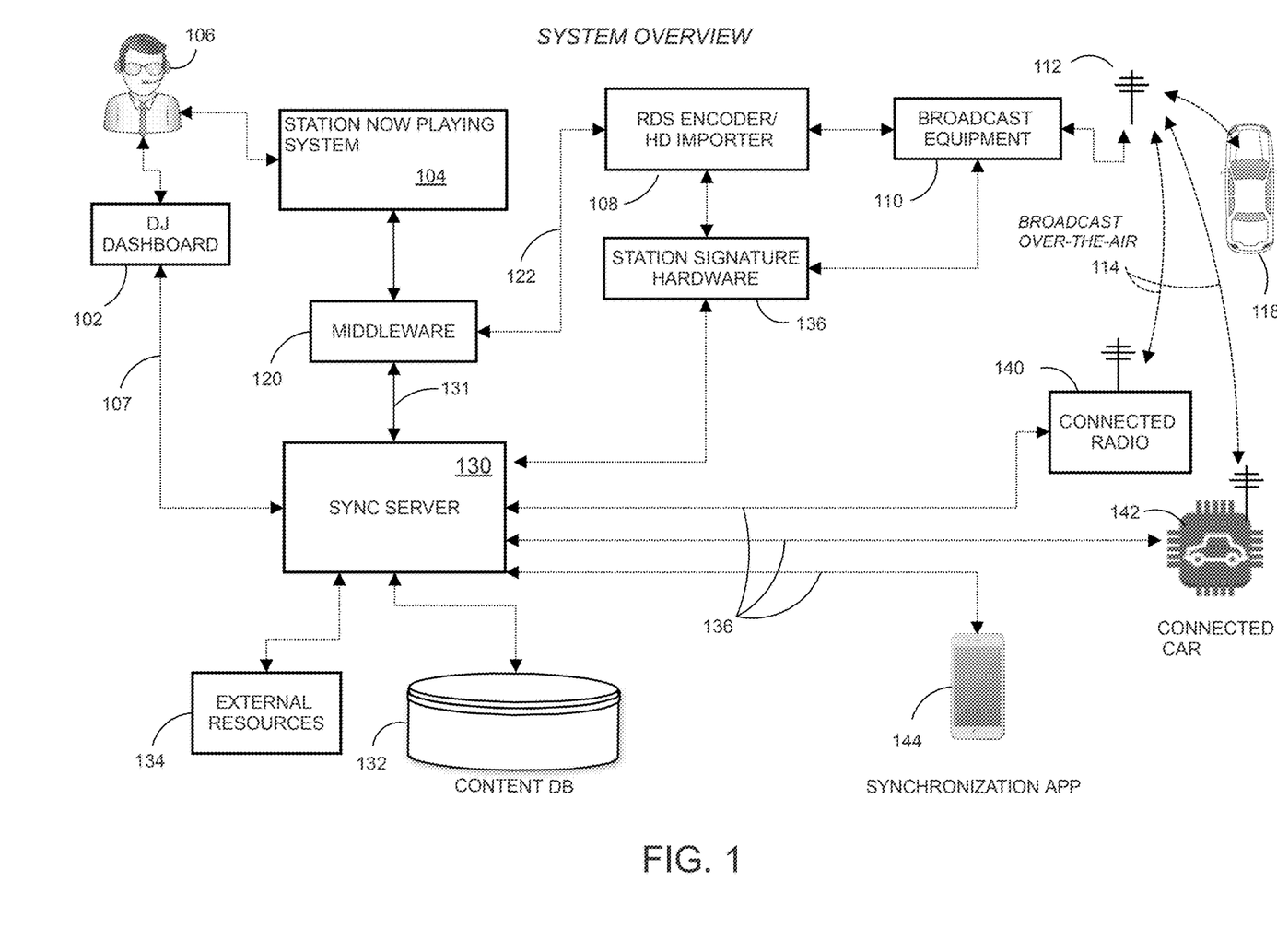
FIG. 1 is a simplified illustration of an example system to provide augmented content for connected over-the-air broadcast radio and/or for mobile application synchronized with over-the-air broadcast radio.

FIG. 1 is a simplified illustration or block diagram of an example system to provide augmented content for connected over-the-air broadcast radio and/or for mobile application synchronized with over-the-air broadcast radio. This may be called simply a "synchronization system" for brevity. A radio station typically operates an automation system. The "station now playing system 104" may be a coupled to or integrated with the station automation system. The automation system is operated by a radio station to generate broadcast radio programming, often 24 hours a day. The now playing system provides data indicating what is currently playing on the broadcast, for example, a song or an interview. More precisely, the now playing system identifies the item that is now beginning or about to begin playing on the station. In other words, it marks the start of the item playing. More detail is given below. In the case of music, the now playing system may provide the title and artist of the song "now playing."

Typically, a live host or "disk jockey" (DJ) 106 controls and narrates the radio programming. The DJ accordingly provides input to the station automation system. The DJ may also interface with a dashboard 102. The DJ dashboard may be implemented in various ways, including implementation as an application program operable on a computer. The DJ dashboard preferably is coupled to a synchronization server.

A synchronization server ("synchronization server 130") (the name is not critical) is central to creating an augmented radio listener experience by providing additional information, especially visual information, to the user over a data connection during the radio broadcast. (We use "listener" and "user" interchangeably except where explicitly noted otherwise.) The additional information is synchronized to the radio broadcast content then playing, as explained below. This additional content is synchronized to the radio broadcast content, not only temporally but also in terms of relevant or related content to enrich the listener experience. Further, the synchronization server may implement interactivity with users who have a data connection, as described in more detail below.

Middleware 120 refers to software elements disposed in or coupled to the station now playing system 104. The middleware receives "event" messages from the NP system. When a song is played over the radio station, the event message identifies the song now playing (for example, by title and artist). When an ad is playing, the event message May identify the advertiser and or the specific ad by an identifier. An event message may indicate other activities on-air such as DJ talking or live interview in progress or an AMBER alert in progress. (AMBER is an emergency response system that disseminates information about a missing person (usually a child), by media broadcasting or electronic roadway signs. In the case of an AMBER alert, the disclosed system could be used to attach a photo of the missing person to the alert, sending the photo over a data connection (136)). The middleware provides now playing data to the synchronization server 130 via bidirectional connection 131.

In an alternative embodiment, the middleware may be completely removed and be replaced with a direct connection between the station and the synchronization server.

The middleware 120 also has a bidirectional data connection 122 to the station RDS Encoder/HD importer equipment 108. More detail is provided in the operations described below with regard to FIG. 2. Briefly, in operation, based on the item NP, as identified by the middleware, the synchronization server provides textual content, preferably one or more items of the "basic content" described below. The text is provided from the synchronization server 130, via the middleware 120, to the RDS Encoder/HD importer equipment 108, to be embedded in the broadcast data submitted to the radio broadcast equipment 110. That broadcast equipment 110 generates the RF signals to one or more antenna 112 for broadcast over the air to various radio receivers. A radio receiver may be on board a vehicle 118, or handheld, etc. Vehicle 118 in this illustration is not a connected car.

In one embodiment, a station signature component 136 includes hardware and software arranged to generate and maintain a unique identifier or "signature." Each signature may comprise, for example, a short burst of inaudible sounds in a predetermined sequence as described below that can be heard by the synchronized application.

For a given station, the station signature component 136 generates and sends the corresponding signature to the broadcast equipment 110 to be included in the radio broadcast signals. In a preferred embodiment, the signature may be encoded as audio tones, but the tones have a frequency above the human audible range so they do not interfere with the listener experience. The tones may be combined with the audio programming content (for example, music or talking) in the broadcast equipment 110. Various schemes are known for encoding small amounts of digital data in audio tones. As one simple example, the signature may be a binary sequence, and 0 may be represented as a first frequency tone, say 23 kHz, and a binary 1 represented as a second frequency tone, say 25 kHz. Gray coding, PSK and other encoding techniques may be used. These particular frequencies are not critical, but in general the frequencies should be selected to be modestly higher or lower than audible frequency. The station signature component 136 may be coupled to the broadcast equipment 110 in order to embed the signature in the audio portion of the radio broadcast signals. This signature may be used by a mobile device as described next. The embedded station signature may be detected and decoded by an application program executable in a mobile device such as a smartphone. In the case of the connected radio or connected vehicle, the vehicle receiver system "knows" what station it is currently receiving without the use of an embedded signature.

There are three primary scenarios addressed here. First, radio broadcast over-the-air (OTA), illustrated by dashed lines 114 in FIG. 1, representing signals emanating from the broadcast antenna 112. In this case, basic augmented data, provided by the synchronization server, is transmitted by embedding it in the OTA broadcast signals, for example, using RDS encoder. The vehicle 118 has a suitable receiver to receive OTA broadcasts and it may be able to decode embedded content. Second, a connected radio, represented at 140, has a receiver to receive the OTA broadcast content from 112 and also has wifi, cellular, or other wireless data connectivity 136 that enables bidirectional communication of digital data. Similarly, a connected car 142 has a receiver onboard to receive the OTA broadcast content from 112 and also has wifi, cellular, or other wireless data connectivity 136 that enables bidirectional communication of digital data. Third, a user may have a radio (not shown) that may or may not lack display to reproduce text or visual information. The radio also may or may not have a display but no user input interface for interactive communications. Here, a user device, for example, a smartphone, can be used to run the synchronization application (app) to provide user interfaces to display rich data and interactive user input, all synchronized to OTA broadcast data being received by the radio. In this disclosure, the data connections may be used, among other things, to receive rich data, for example, visual data, for display on the connected device to augment the corresponding OTA radio broadcast content and in some embodiments for interactivity. Where a synchronization application is in use, the associated (or merely nearby) radio becomes functionally much like or more advanced than a connected radio. To be clear, however, we refer the device running the synchronization application as a connected device.

Figure 2:
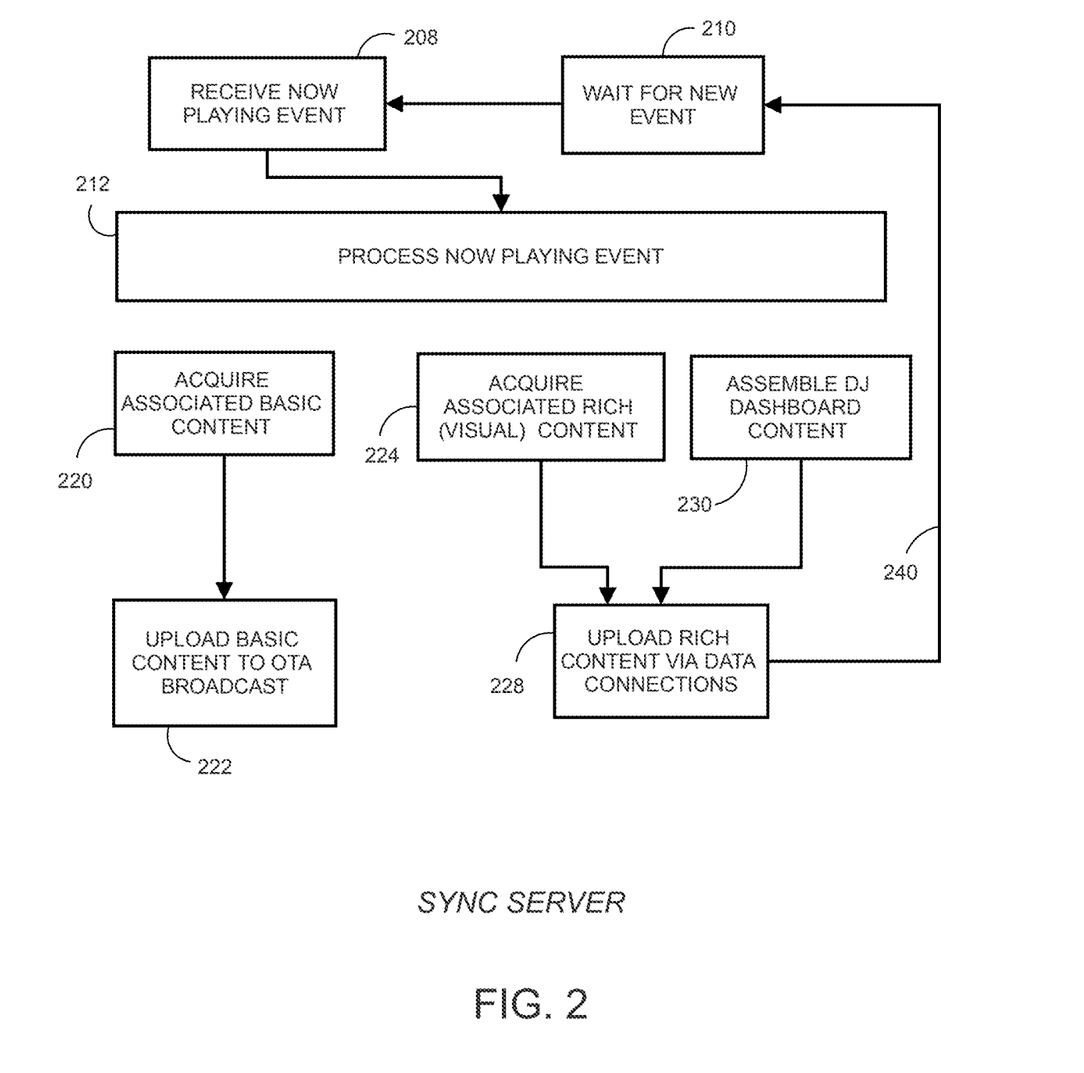
FIG. 2 is a simplified flow diagram illustrating selected operations executable by the synchronization server of FIG. 1.

FIG. 2 is a simplified flow diagram illustrating selected operations of the synchronization server 130. In this figure, it is assumed that at least one user device is receiving a radio broadcast over the air. The synchronization server is in communication with the corresponding radio station middleware. The synchronization server receives a now playing ("NP") event message from the station now playing system, block 208. The event may be captured and forwarded by the middleware. The event may be asynchronous, triggered by a change in the type of content now being broadcast; for example, the start of a song, or the start of DJ talking, or the start of an advertisement.

In an embodiment, each such "event" may comprise data and an identifier (ID). In this way, the station now playing component 104 identifies what is playing or about to play on the broadcast radio system-described in more detail below. The middleware 120 provides content from the synchronization server via link 122 to the station RDS encoder/HD importer 108. This content may include embedded text for display on an FM receiver. We refer to that as text or textual content, as distinguished from the richer "visuals" or visual content transmitted via data connections.

The synchronization server processes the NP event, block 212. The synchronization server assembles basic content associated with the item now playing, block 220. In one embodiment, for a song now playing event, the server may acquire basic content by querying a datastore, based on the song title and artist. During an advertisement, the synchronization server may acquire basic content associated with that advertisement, again from a datastore. At other times, for example, while a DJ is talking (as indicated by the event message), the synchronization server may acquire default basic content that has been designated for use at such times. In each case, preferably in near real time, the acquired basic content is uploaded to the OTA broadcast system for transmission during the identified event.

The synchronization server also acquires rich or visual content associated with the item now playing, block 224. The visual content is uploaded via a data connection, block 228. Specifically, the visual content will be transmitted over a corresponding data connection to one or more connected devices that are identified as then receiving the radio broadcast OTA. In the case of the synchronization app, the host device itself may not be receiving the OTA broadcast. After sending the rich content, the synchronization server may loop via path 240 to wait for a new event, block 210. In an embodiment, a content datastore may store programming data for each station. The programming data may include basic and or rich content associated with each scheduled item. It may also include default content for use, for example, when a DJ is talking. The stored content may include multiple versions of content for use in personalization as described later.

Text Services (Basic Content) on RDS and HD Radio

Below are examples of text services that can be provided over a broadcast radio channel. This basic content may be selected based on the item now playing on the broadcast radio station. Details are given below on how the items now playing are identified, how augmented or synchronized content is selected and accessed. The augmented content is "synchronized" or coordinated with the current broadcast content now playing. The basic content typically depends on the type of item now playing. In a presently preferred embodiment, the types of items now playing may be categorized as Music, Advertisements (Ads), and Other (for example, disk jockey talking).

Non-limiting examples of such basic content may include the following.

a. ARTIST AND TITLE

Figure 3A:
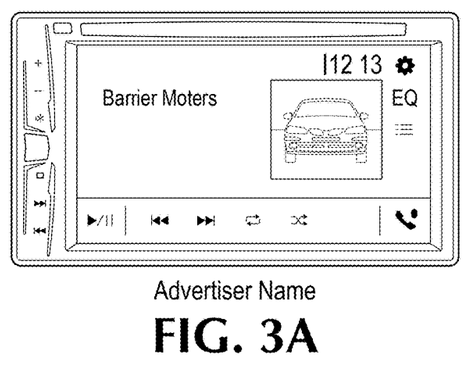
FIGS. 3A-3E illustrate examples of augmented content displayed on a display screen of a connected radio or a mobile device synchronized to an OTA radio broadcast.

Display artist and song title when music plays. See FIG. 3E for example.

b. DEFAULT STATION MESSAGE

Station tag line plus top of the hour message c. SYNDICATOR

Syndicated program music artist and title during syndicated programs if available d. STATION CAMPAIGNS Non-advertising messaging: Program names, station promos, etc.

e. ADSYNC-NAME

Advertiser name appears when ad airs. See FIG. 3A.

f. ADSYNC-MESSAGE

Figure 3B:
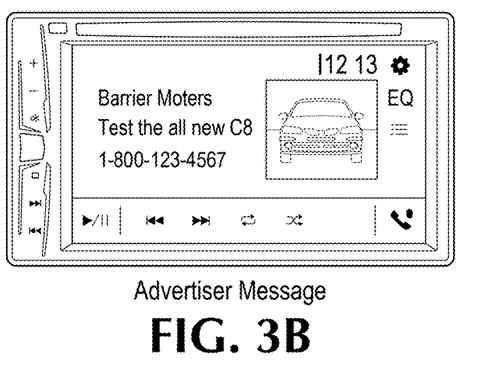
Figure 3C:
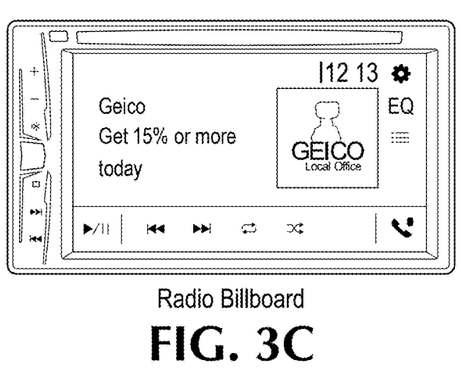
Figure 3D:
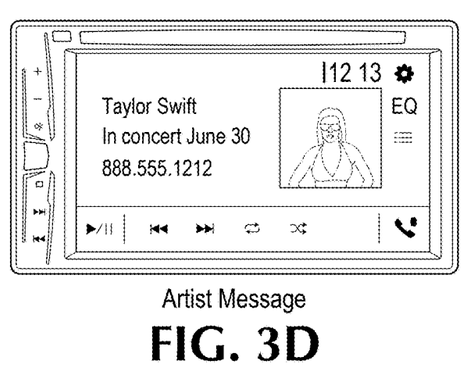
Figure 3E:
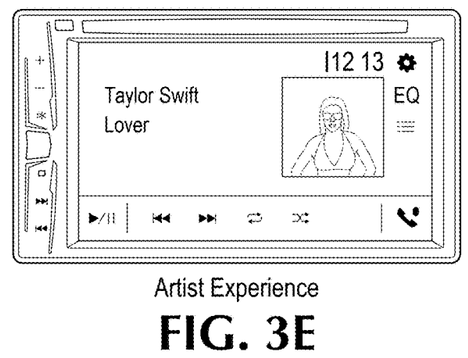

Advertiser specific message appears when ad airs-See FIG. 3B.

g. RADIO BILLBOARD

Visual non-synchronized ads during Music or Jock Talk h. SPECIAL CATEGORIES

Campaign messages appear only when specific categories play—for example when the DJ is promoting a specific product.

i. LINER NOTES

Synchronized messages with selected artists when their songs air j. CONNECTED RADIO Connection to Radio DNS, DTS Connected Radio, Connected Travel k. WEB PLAYLIST/API Three-day, for example, web-Playlist and Mini-playlist. API services for playlist may include music and ads on Mobile and Web.

Figure 4:
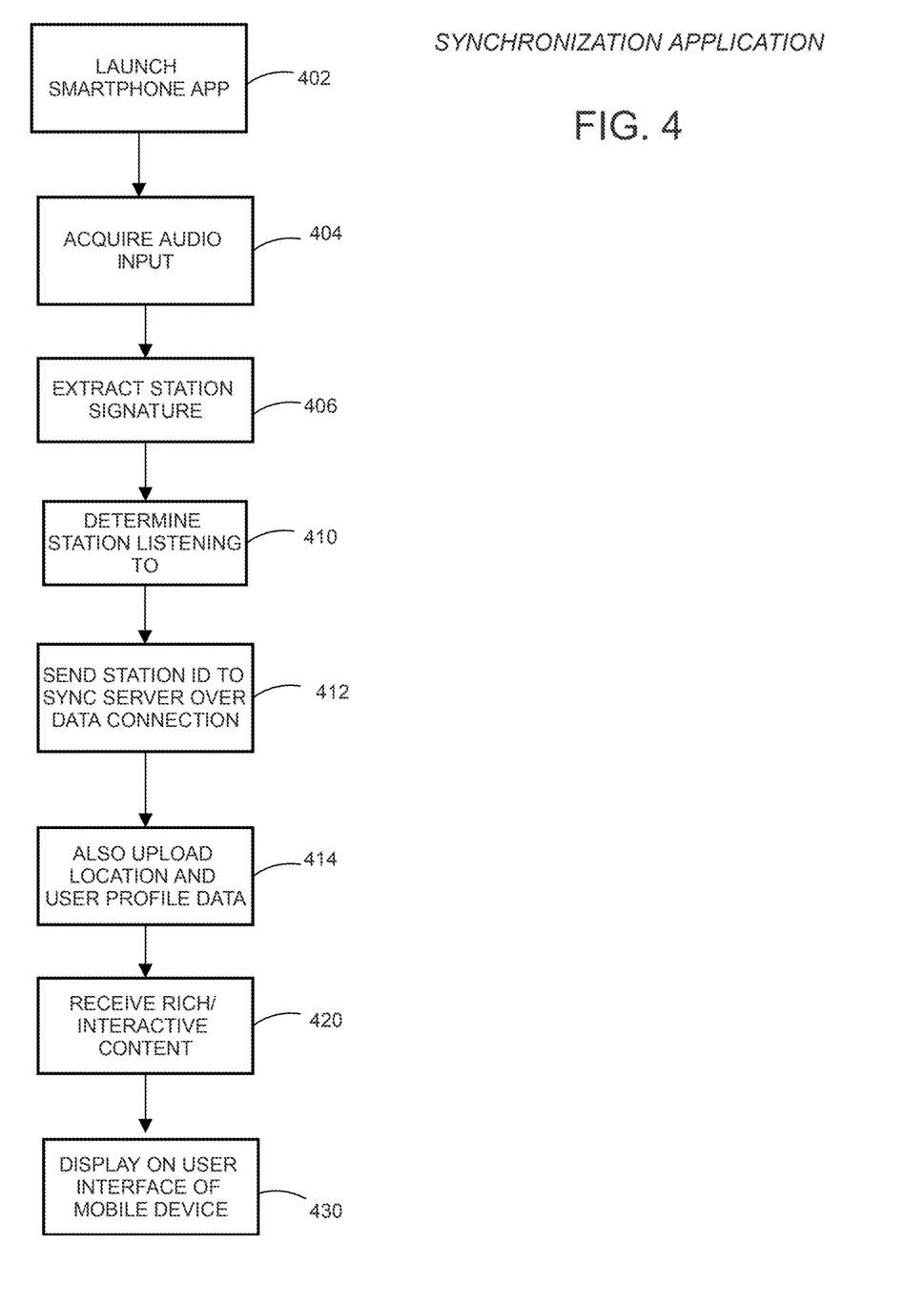
FIG. 4 is a simplified flow diagram of an example synchronization application program illustrating selected interactions with a synchronization server.

FIG. 4 shows a simplified flow diagram of one example algorithm, preferably implemented in machine-readable code or instructions executable on a processor of a mobile device, for example, 144 in FIG. 1. The executable code preferably is implemented in a mobile app, which we call a "synchronization app," for use in augmenting an over-the-air radio broadcast. The synchronization app may be made available for download from a suitable server or "App Store." The app is launched, block 402, and then it begins (automatically or responsive to user input) to acquire audio input, block 404. It may acquire audio input, for example, through a microphone, of the live radio broadcast playing on a nearby radio receiver. The process extracts the station signature from the audio input, block 406. Next the process determines what station is being received, block 410. It then transmits the corresponding station identifier to the synchronization server (130 in FIG. 1) over a data connection, block 412. In an embodiment, the smartphone app also sends to the synchronization server its location and user profile data, block 414. The application may acquire its location, for example, from onboard GPS systems. In some cases, content may be localized (or selected) based on the radio station broadcast area. At block 420, the smartphone application receives data that is synchronized to the item now playing on the radio. The received data may comprise one or both of basic textual data and richer visual data. The app displays the received data on a user interface of the mobile device, block 430, to augment the content now playing on the radio.

User Profile Data

Referring again to FIG. 4, the example application program may acquire user profile data in several ways. In one example, the application program, upon installation or first use, may implement a setup and initialization process (not shown) that includes acquiring profile data from the user. In that regard, the application may present questions or choices to the user. It might ask about products or topics of interest, or conversely, products or topics NOT of interest to the user. It may ask for age, gender, nationality, etc. It may ask about favorite foods, sports teams, travel destinations, etc. In some embodiments, the synchronization server system may acquire user profile data from third party sources (external resources 134 in FIG. 1). The system may build or refine a user profile based on feedback from the user during operation of the system. For example, a touch-screen of a car head unit or a smartphone (144) may be used to acquire user feedback. "Did you like/not like that song?" "Was that coffee advertisement of interest to you?" Personalization may depend on different factors such as listener profile, preferences, data collected by 3rd party services, location, time etc.

Referring once again to FIG. 4, the illustrative smartphone app receives additional content (for example, visual content) from the synchronization server over the data connection, block 420. The additional content may be interactive, taking advantage of the user interface elements of a connected radio, connected vehicle, or smartphone, or any combination thereof.

As one example of interactivity, the DJ 106 talking at the broadcast station may pose a question to listeners, for example, seeking a yes/no or multiple-choice answer. In an embodiment, the DJ may initiate the question or poll at the DJ dashboard 102. The synchronization server 130, based on interfacing with the DJ dashboard via connection 107, then generates the poll and transmits it via data connections 136, which may include the data connection to smartphone 144. In this example, the additional content is synchronized to the DJ now talking. The smartphone app is configured to present the poll at a user interface, and receive the user input in response, and then return the response to the synchronization server 130 over the data connection. The synchronization server may pass the response on to the DJ dashboard 102. In an embodiment, the synchronization server may be programmed to aggregate such responses from multiple listener devices (see 140, 142, 144 as examples), and transmit an aggregate result to the DJ dashboard.

Figure 5:
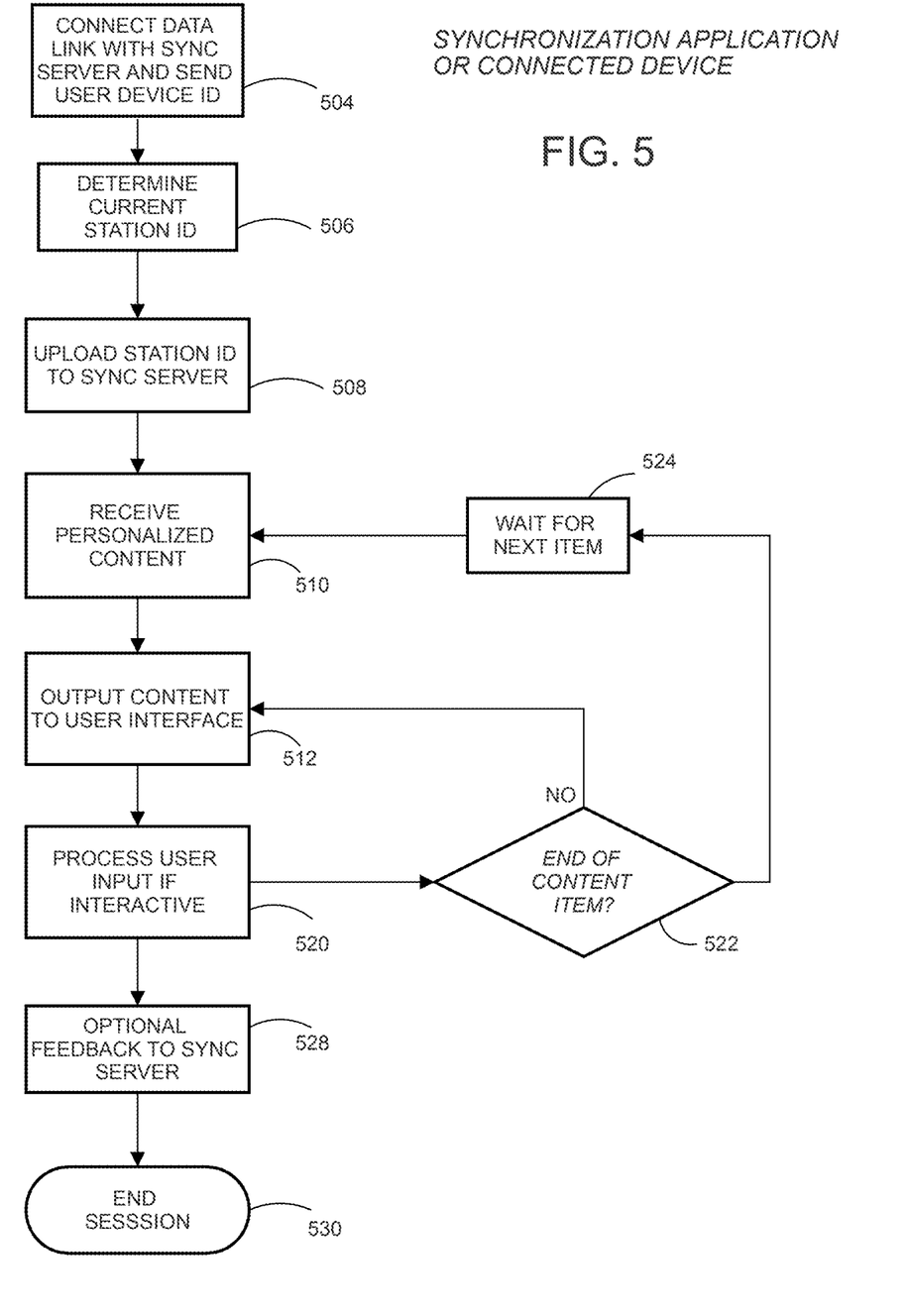
FIG. 5 is a simplified flow diagram of an example process to provide augmented content to a user interface in a synchronization application or a connected device.

FIG. 5 is a simplified flow diagram of an example process to provide augmented content to a user interface in a synchronization application or a connected device. Preliminarily, the process executes a setup or initialization process to acquire information, including in some embodiments profile information of a user. The synchronization app or connected device app connects over a data link 136 (for example, wireless, Wi-Fi, internet) with the synchronization server (130 in FIG. 1), block 504. The app sends its own ID over the data link, block 504. The app further identifies a radio station of interest now playing, block 506. The station can be identified, in the case of the synchronization app, using a signature process as illustrated in FIG. 4. In the case of a connected device or car stereo, the receiver "knows" what station it is currently receiving OTA. In either case, the app uploads the station ID, block 508, to the synchronization server 130. Next the app receives content data, especially visual content data, via the data link, from the synchronization server. The visual content data may include, for example, picture files such as TIFF (.tif, .tiff) . . . GIF (.gif) . . . PNG (.png) . . . EPS (.eps) . . . and RAW Image Files. (Specific examples of visual data, synchronized to the broadcast radio content now playing, are given in FIG. 3.) The app presents the content on the user interface of the mobile device or connected radio, block 512.

The output may be interactive, in which case the app processes the user input, block 520. In some cases, the connected device may have buttons or a touch screen for user input. For example, the visual output may include a voting button. The app receives the user selection or other input records it. In another embodiment, the user input may be clicking a link, and the app executes the link in a web browser. The user may then further interact with the linked destination, for example, to purchase the song now playing on the radio station. When the content item is finished, for example, by expiration of a time period, decision 522, the app may wait for a next item, block 524, and then receive additional data, block 510. For example, the synchronization server visual content provided for a given song may comprise multiple content items. A preferred use of the mobile app is where a user is listening to a broadcast radio that is not connected to a data link.

Figure 6:
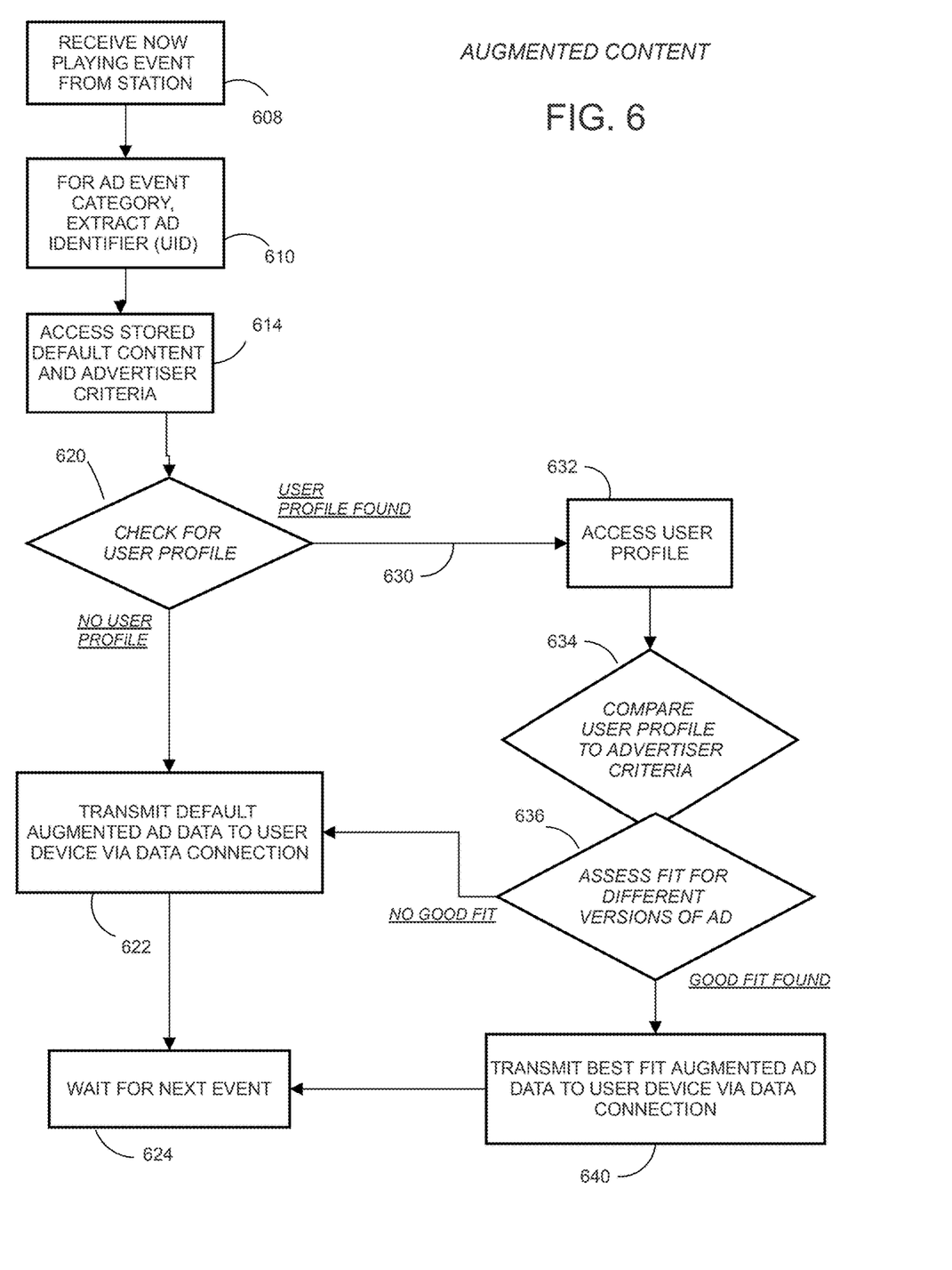
FIG. 6 is a simplified flow diagram of one example process to provide augmented and personalized advertising content for a radio station.

FIG. 6 is a simplified flow diagram of one example process to provide augmented and personalized advertising content for a radio station. This process may be implemented in a system of the type illustrated in FIG. 1. For example, the process may be implemented in software executable on a synchronization server. In an embodiment, the server may receive a now-playing (NP) event message, block 608. The event message may be generated by a broadcast station automation system. The event message signals the beginning of an item playing on the radio station. In one embodiment, the event message includes a category field or code, indicating the type of event, for example, music, an advertisement, or other such as a DJ talking. The category identifiers or codes may be predetermined for each station.

The event message may be received by middleware such as middleware 120 in FIG. 1 and forwarded to the synchronization server 130. This should be done in near real time, so that the following steps are synchronized to the content now playing on the radio. In a preferred embodiment, for the advertisement category, the event message includes an identifier of the ad (UID). This UID may be extracted from the event message, block 610. The UID may be used to query a database or file, to access stored content associated with the particular ad. For example, the stored content may be a logo, picture, or other visual data.

In one embodiment, each station may provide a data file storing data or content for the items it plans to broadcast (for example, songs and advertisements) in the near future. The data file may be stored in a datastore such as content database 132 accessible to the synchronization server. In one embodiment, the station(s) may provide such a file on a daily basis, the file containing content for the ads planned to air the following day. Such files may be provided or updated on a more or less frequent basis. They may be uploaded at random times as deemed appropriate by the station or the synchronization system. At block 614, the process accesses the default stored content (augmented data) for the identified advertisement. The stored content may include, for example, various information such as Ad messages, coupons, pictures, locations, directions, click to call, etc. Some examples of augmented content displays are shown in FIGS. 3A-3E described below.

In some embodiments, the process may check for connected devices that have logged in or connected to the synchronization system, decision 620. For example, as discussed with regard to FIG. 5. If there is no user profile available for a given connection, the process proceeds to transmit the default augmented data associated with the ad to the connected user devices, block 622. Then the process may return, block 634, to await the next event message at block 608.

On the other hand, if a user profile is found for a given user/device (branch "user profile found"), the process accesses the user profile, block 632, via path 630. The process compares the user profile to the advertiser criteria, block 634. In some embodiments, there may be multiple different versions of an ad provided by the advertiser (and stored in the datastore), each version having a corresponding preferred audience criteria. In this case, the next step is to assess the alignment or "fit" of each version of the ad to the user profile, based on the corresponding audience criteria, decision 636. Put another way, is the ad content aligned with the user profile so that the user may be receptive to or interested in the ad content? For example, if the user profile indicates a member of demographic group of people in their 20's, and the advertiser audience criteria specifies people over 50, the "fit" is not good. If none of the ad augment data versions is a good fit for the user profile, the process proceeds via branch "No good fit" to use the default augmented ad data, block 622.

Alternatively, if at least one version of the augmented ad data fits the user profile, the process may select a version of the augmented ad that best fits the user profile and transmit that version to the user device via the corresponding data connection.

In some embodiments the system may select a different version of the ad, or an entirely different ad (an alternative ad), to better fit the user profile. The system may then play the alternative content, over the corresponding user device connection, block 632. A connected radio may be triggered to mute the OTA broadcast audio and substitute streaming audio provided over the data connection to present the alternative ad. Preferably, the alternative ad content plays for the same duration of the original ad. In some embodiments, the "fit" assessment may be a non-binary value, say on a scale of 1-10. The fit may be classified as "good" or adequate where the value exceeds a predetermined threshold value.

Visual content may be transmitted over the parallel bi-directional data communication links, for example, links 136 in FIG. 1, to connected user devices that include or are coupled to graphics-capable display screens. In some embodiments, textual aspects of the visual content may be transmitted over the air as well to hybrid radio devices. Visual synchronized content may include images or graphics. Non-limiting examples may include the following:

ARTIST EXPERIENCE
  Album art in sync with Music
ADVERTISER EXPERIENCE
  Advertiser logo or art in sync with airing audio ads
RADIO BILLBOARD
  Visual sponsorships and campaigns during music or jock talk with associated art
STATION ART
  Station logo, DJ picture, program logo etc.

EQUIPMENT AND SOFTWARE

Most of the equipment discussed above comprises hardware and associated software. For example, the typical electronic device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein Portions of the hardware (processors) and data storage assets (for example, databases) described above may be provisioned as cloud computing services, commercially available from, for example, IBM, Amazon (AWS), and Microsoft (Azure).

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

It will be obvious to those having skill in the art that many changes may be made to the details of the above-described embodiments without departing from the underlying principles of the invention. The scope of the present invention should, therefore, be determined only by the following claims.

The invention claimed is:

1. A method comprising:
generating a radio station broadcast signal comprising a broadcasted audio and an inaudible radio station signature, the broadcasted audio comprising an audio item now playing, the inaudible radio station signature comprising a radio station identifier;
broadcasting the radio station broadcast signal;
providing a middle-ware component configured to identify the audio item now playing of the broadcast audio;
in a synchronization server, receiving from the middle-ware component an identifier that identifies the audio item now playing of the broadcast audio;
in the synchronization server, based on the identifier, selecting second content comprising visual content associated with the audio item now playing, the visual content comprising an image file;
establishing a data connection between the synchronization server and a user device via a data interface of the user device, the user device also configured to receive and decode the radio station broadcasting signal, establishing the data connection comprising receiving, at the synchronizer server, a user device identifier;
receiving, at the synchronization server from the user device via the data connection, the radio station identifier;
transmitting the second content from the synchronization server to the user device via the data connection while the radio station broadcast signal comprising the audio item now playing is being broadcast.

2. The method of claim 1 including:
providing a datastore containing the second content; and
querying the datastore with the identifier;
identifying the second content as being associated with the identifier; and
transmitting the second content to the synchronization server responsive to the datastore query.

3. The method of claim 1 wherein the second content additionally comprises text.

4. The method of claim 1 including:

receiving the radio station broadcast signal;

extracting the radio station identifier from the received radio station broadcast signal; and transmitting the radio station identifier to the synchronization server.

5. The method of claim 4, wherein extracting the radio station identifier comprises decoding the radio station broadcast signal.

6. The method of claim 5, comprising transmitting a synchronization application software program from the synchronization server to the user device.

7. The method of claim 1, wherein the audio item now playing comprises an advertisement associated with a sponsor, and wherein the image file comprises a sponsor logo.

8. The method of claim 7, comprising altering the radio station broadcast signal to remove the audio item now playing and replace it with a second audio item now playing, stopping transmitting the second content, selecting a second visual content associated with the second audio item now playing, and transmitting the second visual content to the user device.

* * * * *